US011425227B2

(12) United States Patent
Hari et al.

(10) Patent No.: US 11,425,227 B2
(45) Date of Patent: Aug. 23, 2022

(54) AUTOMOTIVE CAN DECODING USING SUPERVISED MACHINE LEARNING

(71) Applicant: Ford Global Technologies, LLC, Dearborn, MI (US)

(72) Inventors: Sasidhar Hari, Farmington Hills, MI (US); Praveen Bhupathiraju, Canton, MI (US); Bernard D. Nefcy, Novi, MI (US); Brent Edward Sealy, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 381 days.

(21) Appl. No.: 16/777,150

(22) Filed: Jan. 30, 2020

(65) Prior Publication Data

US 2021/0243280 A1 Aug. 5, 2021

(51) Int. Cl.
*H04L 67/12* (2022.01)
*H04L 69/22* (2022.01)
*H04L 41/22* (2022.01)
*G06N 20/00* (2019.01)
*H04L 12/40* (2006.01)

(52) U.S. Cl.
CPC ............. *H04L 69/22* (2013.01); *G06N 20/00* (2019.01); *H04L 12/40* (2013.01); *H04L 41/22* (2013.01); *H04L 67/12* (2013.01); *H04L 2012/40215* (2013.01); *H04L 2012/40273* (2013.01)

(58) Field of Classification Search
None
See application file for complete search history.

(56) References Cited

U.S. PATENT DOCUMENTS

| 7,403,560 B2 | 7/2008 | Gamper et al. |
| 10,067,502 B1* | 9/2018 | Delp ................... B64C 39/024 |
| 2014/0365228 A1* | 12/2014 | Ng-Thow-Hing ..... G02B 27/01 704/275 |
| 2015/0206358 A1 | 7/2015 | Chen et al. |
| 2016/0035150 A1* | 2/2016 | Barfield, Jr ........ G05B 23/0254 701/29.3 |
| 2018/0025640 A1* | 1/2018 | Micks ................... G08G 1/142 340/932.2 |
| 2020/0389469 A1* | 12/2020 | Litichever ........... H04L 63/0236 |

FOREIGN PATENT DOCUMENTS

WO 2018-005834 A1 1/2018

* cited by examiner

*Primary Examiner* — James A Edwards
(74) *Attorney, Agent, or Firm* — Brandon Hicks; Kilpatrick Townsend & Stockton LLP

(57) ABSTRACT

Techniques for identifying certain signals sent over the CAN bus between components of a vehicle are provided herein. Specifically, certain testing maneuvers designed to engage the component of interest are provided to a technician for performing on the vehicle. The messages can be captured from the CAN bus and analyzed, using supervised machine learning algorithms, to isolate the message ids and the byte numbers so that the values of the component of interest may be observed for determining performance metrics. Once identified, these performance metrics may be used to compare with other vehicles or improve the design and performance of the vehicle.

20 Claims, 10 Drawing Sheets

Messages

[Scroll] [Details] [Pause] [Delete]

| Count | Time | Description | MID | Length | DataBytes | Network |
|---|---|---|---|---|---|---|
| 24050 | 5.217901s | HS CAN $AA | AA | 8 | 2A 13 31 84 04 4C 7A 00 | HS CAN |
| 24050 | 5.218319s | HS CAN $BE | BE | 8 | 04 00 00 03 E9 FF 00 00 | HS CAN |
| 30069 | 5.212482s | HS CAN2 $C0 | C0 | 5 | FF AD 7B B7 62 | HS CAN2 |
| 30068 | 5.212406s | HS CAN $C1 | C1 | 8 | F0 B1 5C 56 70 FE 35 E2 | HS CAN |
| 30068 | 5.212716s | HS CAN2 $C1 | C1 | 8 | F0 B1 5C 56 70 FE 35 E2 | HS CAN2 |
| 30069 | 5.212951s | HS CAN2 $C5 | C5 | 8 | F3 26 2E 02 F3 A2 A1 68 | HS CAN2 |
| 30069 | 5.212793s | HS CAN $C5 | C5 | 8 | F3 26 2E 02 F3 A2 A1 68 | HS CAN |
| 24052 | 5.212567s | HS CAN $C7 | C7 | 4 | 02 1C 84 9B | HS CAN |
| 24050 | 5.218564s | HS CAN $C9 | C9 | 8 | 00 00 00 27 00 00 18 00 | HS CAN |
| 30064 | 5.217411s | HS CAN2 $C9 | C9 | 6 | 46 45 00 20 00 00 | HS CAN2 |
| 3002 | 5.192900s | HS CAN $D0 | D0 | 8 | 80 00 80 00 80 00 80 00 | HS CAN |
| 30068 | 5.213262s | HS CAN $D1 | D1 | 7 | 80 00 BF FE 00 FE 00 | HS CAN |
| 24049 | 5.219044s | HS CAN $D3 | D3 | 8 | 2A 0D 00 27 00 00 18 00 | HS CAN |

AUTOMOTIVE CAN DECODING USING SUPERVISED MACHINE LEARNING

BACKGROUND

In a vehicle, all the electronic modules (components) communicate using a Controller Area Network (CAN) protocol over the vehicle CAN bus. It may be advantageous to parse the communication between components to understand the functionality of the whole vehicle. In particular, certain signals sent over the CAN bus can provide performance metrics of that vehicle. However, decoding those messages without knowing the schema used by the vehicle can be difficult if not impossible because a typical CAN bus includes hundreds of message identifiers, several combinations of which may be the certain signals, leaving thousands of potential combinations to decipher.

SUMMARY

Techniques for identifying certain signals sent over the CAN bus between components of a vehicle are provided herein. Specifically, certain testing maneuvers designed to engage the component of interest are provided to a technician for performing on the vehicle. The messages can be captured from the CAN bus and analyzed, using supervised machine learning algorithms, to isolate the message ids and the byte numbers so that the values of the component of interest may be observed for determining performance metrics. Once identified, these performance metrics may be used to compare with other vehicles and/or improve the design and performance of the vehicle.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for decoding messages on a vehicle controller area network (CAN) bus. The method may include using a computer system to provide one or more testing maneuvers to perform on a vehicle to a technician via a graphical user interface. The testing maneuvers may be associated with a component of the vehicle. The computer system may receive a stream of messages over the CAN bus of the vehicle in response to the technician performing the testing maneuvers. Each message may include a message identifier, a byte number, and a value for the byte number, where the byte number represents a location of data within the message that contains information about the component of interest.

The computer system may isolate a component message identifier and a component byte number associated with the component based on the messages in the stream. To isolate the component message identifier and the component byte number, the computer system may use a supervised machine learning algorithm to identify a subset of byte numbers within the stream of messages having changing values. The supervised machine learning algorithm may also be used to select a subset of rules associated with the component and select the component message identifier and the component byte number based on applying the subset of rules to each of the subset of byte numbers. Other embodiments of this aspect include corresponding computer systems, apparatus, and computer programs recorded on one or more computer storage devices, each configured to perform the actions of the methods.

Implementations may include one or more of the following features. In some embodiments, the testing maneuvers are based on a type of the vehicle (e.g., hybrid, electric, or internal combustion engine). In some embodiments the method further includes providing additional testing maneuvers to perform on the vehicle. The computer system may receive an additional stream of messages over the CAN bus in response to the technician performing the additional testing maneuvers. In such embodiments, isolating the component is further based on the additional messages. In some embodiments, the computer system generates a graph representing the values of the component byte number over the time period in which the technician performed the testing maneuvers. The technician or another engineer may view the graph via the graphical user interface. In some embodiments, the graph is updated on a live basis for a user to observe during the testing. In some embodiments, more than one signal may be identified as the potential message identifier and component byte number associated with the component. In such embodiments, the computer system may isolate a potential message identifier and potential byte number that are potentially associated with the component and generate a second graph representing the values of the potential byte number over the time period of the testing. The second graph may be provided via the graphical user interface. In some embodiments, the technician or an engineer may select the correct component message identifier and byte number from the potential message identifiers and byte numbers shown in the graphs. In some embodiments the computer system may generate a performance metric database for the vehicle. The computer system may store the component message identifier, the component byte number, and an association between the component, the component message identifier, and the component byte number in the performance metric database. In some embodiments the computer system may generate a scaling factor and offset values to apply to values of the component byte number. In such embodiments, the computer system may store the scaling factor, the offset values, and an association between the scaling factor, the offset values, and the component in the performance metric database. Implementations of the described techniques may include hardware, a method or process, or computer software on a computer-accessible medium.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 3 illustrates an example display output of CAN bus messages, according to some embodiments.

DETAILED DESCRIPTION

As discussed above, it may be beneficial to identify certain signals sent over a vehicle's controller area network (CAN) bus between components. The signals can be decoded to gather performance metrics of the vehicle. However, the CAN bus communicates in a binary format and the messages streaming over the CAN bus number in the hundreds over even short time periods. To understand the functioning of the vehicle, particular messages that relay the sensor or component information that the technician or engineer are interested in need to be identified. In the past, this type of analysis could be performed manually, but it is extremely time intensive and must be performed by an experienced engineer. Specifically, the engineer must review the stream of data, going through all bytes in a message one at a time, to identify changing values and narrow the messages to those of interest. This can take weeks since there are several hundreds of messages with most messages carrying up to eight bytes. Even then, it may not be possible to identify the messages of interest. Accordingly, techniques for efficiently and accurately decoding the signals of interest are needed.

To address the above described problem, techniques are disclosed herein for efficiently and accurately decoding signals on a CAN bus of a vehicle. The techniques include using an analysis system that captures messages on the CAN bus of a vehicle by connection to the access port of the vehicle. A technician can perform a set of testing maneuvers, and the analysis system can intake the messages and use supervised machine learning to apply rules to the signals contained in the messages to isolate the signals of interest for identifying the information related to the component of interest. Graphs of the signals may be generated for the technician or engineer to view and confirm the component of interest is properly identified by the signals. A performance metric database of information to relate the component information to the CAN bus message information (including the message ID and byte numbers associated with the components) can be generated and may include scaling factors for each component to be applied to the values associated with the components. The scaling factor may be used to convert values to engineering values which can be used to identify performance metrics in the vehicle. Each vehicle that is tested may have a performance metric database that includes the message identifier, byte numbers, and scaling factor for each characteristic of component of interest stored for performance metric evaluation.

Figure 1:
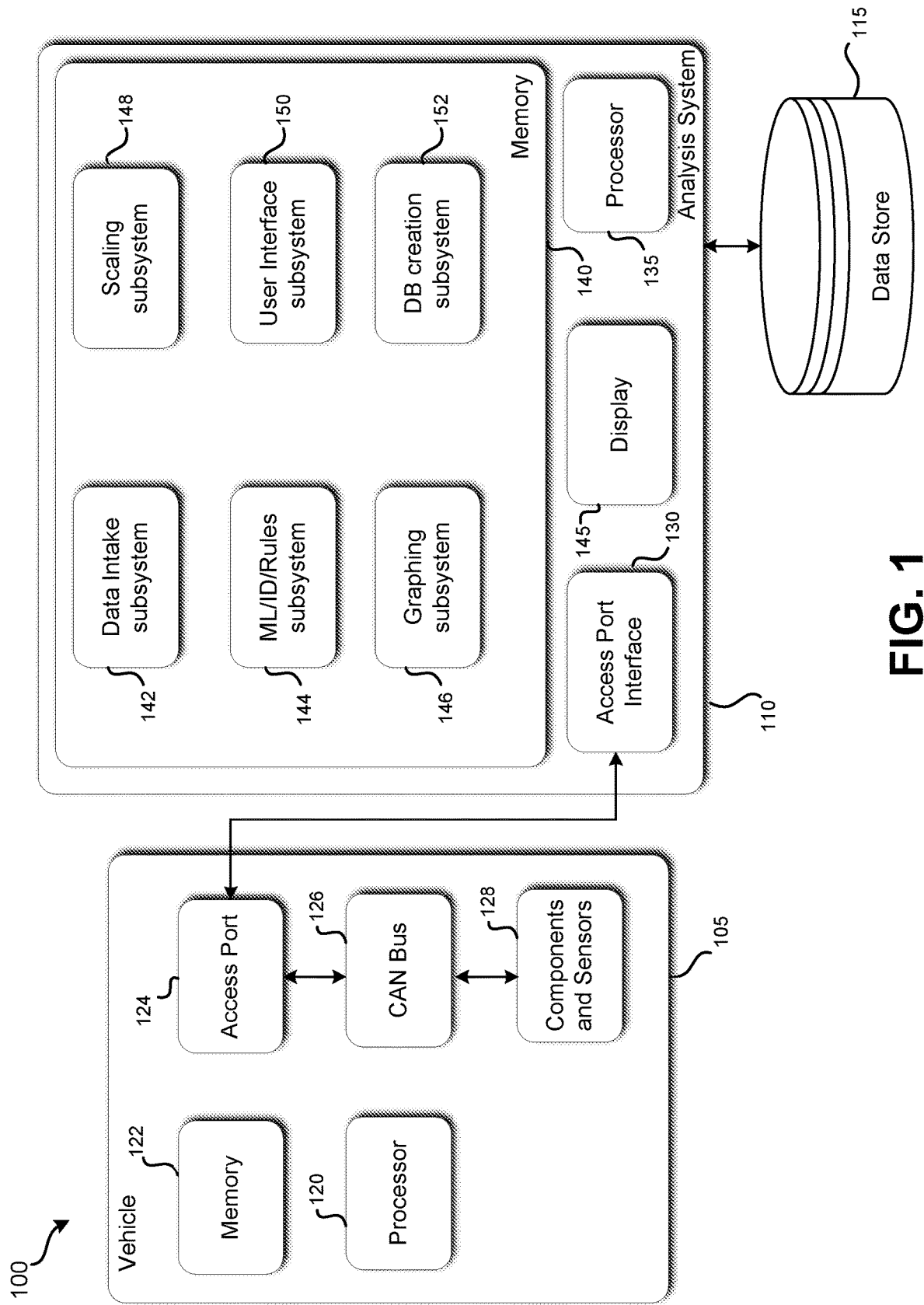
FIG. 1 illustrates a decoding system, according to some embodiments.

Turning to FIG. 1, an exemplary decoding system 100 is depicted. The decoding system 100 includes a vehicle 105, an analysis system 110, and a data store 115. While certain components are described herein for ease of describing the functionality of decoding system 100, more or fewer components may be included herein without departing from the scope of the disclosure. For example, many vehicles 105 and analysis systems 110 may be included and each vehicle 105 and analysis system 110 may include more or fewer components to perform the functionality described herein.

Vehicle 105 may be any vehicle that uses a CAN bus 126 and the CAN bus protocol. Vehicle 105 includes a processor 120, memory 122, access port 124, CAN bus 126 and components and sensors 128. The processor 120 may execute instructions stored in memory 122. Further, vehicle 105 may include a computing system that includes memory 122 and processor 120 such as computing device 600 as described with respect to FIG. 6. While only specific components of vehicle 105 are described herein, vehicle 105 includes many other components left out of this description for simplicity. For example, vehicle 105 includes components for driving such as tires, a drivetrain, an engine, and the like. Vehicle 105 may further include other components, subsystems, or instructions in memory 122 that are left out for simplicity of description of the functionality described herein.

Access port 124 may comprise a connector to which an external device, such as analysis system 110 may be connected to the vehicle 105 for interception of messages being transmitted on CAN bus 126.

The CAN bus 126 is a network connecting all the components and sensors 128 as well as the access port 124. Components and sensors 128 include many different components within vehicle 105. The components and sensors 128 may communicate messages to each other across CAN bus 126. Components and sensors 128 are described in more detail with respect to FIG. 2.

Analysis system 110 includes access port interface 130, processor 135, memory 140, and display 145. Instructions stored within memory 140 may be executed by processor 135 for performing functions described herein. Access port interface 130 may connect to access port 124 to provide analysis system 110 with access to the messages streaming on CAN bus 126. The access port interface 130 may intercept the messages on CAN bus 126. The access port interface 130 may have a hardwired or a wireless connection to the access port 124. The access port interface 130 receives the message stream and sends the message stream to the data intake subsystem 142.

Memory 140 includes data intake subsystem 142, machine learning, identification, and rules (ML/ID/Rules) subsystem 144, graphing subsystem 146, scaling subsystem 148, user interface subsystem 150, and database creation subsystem 152. While specific subsystems are depicted, more or fewer subsystems may be utilized to perform the functionality described herein.

User interface subsystem 150 provides a graphical user interface for the technician or any user to interface with analysis system 110 via a display such as display 145. Display 145 may be any display provided for viewing and interacting with user interface subsystem 150. The display may be a touch screen or a non-touch screen. With non-touch screen devices, a keyboard, keypad, or other input device may be included in the analysis system 110 for receiving input from the user in the graphical user interface. The graphical user interface is described in more detail with respect to FIGS. 4A-4C. Initially, the user may receive a testing maneuver to perform via the graphical user interface. The user or technician then performs the testing maneuver on vehicle 105 while analysis system 110 is coupled with the access port 124 of the vehicle 105. More than one testing maneuver may be performed, and the output the testing results, as described in more detail herein, may be displayed via the user interface subsystem 150 to the user in the graphical user interface.

Data intake subsystem 142 may receive the message stream from access port interface 130 of the messages streaming over CAN bus 126. The data intake subsystem 142 may perform some initial data processing to validate the messages or otherwise process them for use by ML/ID/Rules subsystem 144.

ML/ID/Rules subsystem 144 receives the stream of messages from data intake subsystem 142. ML/ID/Rules subsystem 144 uses supervised machine learning to apply a set of rules to identify the signal associated with the component of interest. The component of interest may be any component and the signal may be associated with a characteristic of the component of the vehicle 105. For example, the engine torque, motor torque, battery voltage, battery current, steering input, accelerator pedal position, brake pedal position, brake pressure, engine speed, motor speed, gear position, vehicle speed, clutch disconnect position, wheel speed, fuel pressure, engine coolant temperature, engine air charge temperature, engine air flow rate, engine intake manifold pressure, engine fuel flow, motor temperature, transmission oil temperature, battery temperature, driver demanded wheel torque, and climate control signals are among some characteristics of components that may be of interest to an engineer.

The messages streaming from the CAN bus 126 may include messages between the component of interest or a sensor monitoring the characteristics of the component of interest to another component or sensor on the CAN bus 126. Other messages may also be intercepted on the CAN bus 126 including messages between other components, counters, checksums, and so forth. The goal of the ML/ID/Rules subsystem 144 is to isolate the messages related to the characteristic of the component of interest. The messages streamed during performance of the testing maneuvers provided to the user via the user interface subsystem 150 are captured as part of the message stream. The ML/ID/Rules subsystem 144 uses the selection of the testing maneuvers to determine the characteristic of the component of interest to identify. For example, the testing maneuver may be those associated with identifying the accelerator pedal position. Accordingly, the position is the characteristic of the accelerator component that is of interest in this example. Upon receiving the stream of messages, the supervised machine learning algorithm identifies the messages indicating change of specific bytes in memory. Within the vehicle 105, memory 122 contains, among other things, memory bytes that are associated with the characteristics of the components of interest. For example, certain bytes are associated with a value that indicates the accelerator pedal position. Messages on the CAN bus 126 that indicate the value of the accelerator position have a certain message identifier. The messages also indicate one or more byte numbers and the value for the byte numbers, where the byte numbers indicate the location in the message that stores the value of the accelerator pedal position. All the other characteristics of the components that are of interest, for example, in the list above, each have their own message identifiers and byte numbers. The goal of the ML/ID/Rules subsystem 144 is to identify which message identifiers and byte numbers are associated with which characteristics of components of interest. This is useful, for example, when a vehicle manufacturer would like to compare performance metrics of the manufacturer's vehicles against other manufacturers' vehicles. The manufacturer may not know which memory bytes and messages identifiers are associated with which characteristics of components of interest.

Initially, ML/ID/Rules subsystem 144 removes the checksum messages and counter messages, often that have activity prior to the testing maneuver input, from the messages that are analyzed. The remaining messages are analyzed by the ML/ID/Rules subsystem 144. Signals that have changing values are identified as potentially relevant. The stream of messages will include many messages with the same message identifier and byte numbers with differing values, the combination of which indicates a changing signal for a characteristic of a component. The testing maneuvers performed are designed to minimize the number of messages on the CAN bus 126 when the testing is performed. Then, a set of rules are applied by the supervised machine learning algorithm to further isolate the signal of interest. The rules that are applied depend upon which characteristic of which component is under analysis. For example, if the accelerator pedal position is under analysis, rules including, for example, that the value of the signal may never be negative, end value equals the start value, no change in the signal during the initialization period of the testing maneuver, and so forth. Other rules may be used for other signals, including, for example, no non-zero values, value must be negative before positive, value must be positive before negative, values must be lesser than start value at some point, values must be greater than the start value at some point, there may be a minimum change in the signal during the testing maneuver, the signal must always rise, the signal must always fall, there may be a minimum number of unique values in the signal data, there may be a minimum percent of time the value must change, and so forth.

Once the rules are applied to the signals identified in the message stream, the number of signals that meet the requirements is limited, in some cases to a single signal. In some cases, there are more than one signal remaining that could potentially be the signal of interest.

The graphing subsystem 146 graphs the isolated signal or signals that are potentially the signal of interest. The graphs for the signals are generated from all the messages in the message stream having the same message identifier and byte numbers, using the value of the byte number in the message, over the time period of the performance of the testing maneuver. Example graphs are provided in the graphical user interface 400 described with respect to FIGS. 4C and 4D. The graphing subsystem 146 provides the graphs to the user interface subsystem 150 for display to the user in the graphical user interface. In some embodiments, the user (a technician or engineer) may select a single graph depicting the signal of the characteristic of interest, indicating that selected signal and associated message identifier and byte numbers are associated with the characteristic of the component of interest. That feedback can be provided to ML/ID/Rules subsystem 144, to set the message identifier, byte number, and characteristic of the component of interest. Setting the association between the message identifier and byte number and characteristic of the component of interest may include storing the association in memory 140 of the analysis system 110, storing the association in the data store 115, or providing the association to the database creation subsystem 152 for storage.

Scaling subsystem 148 may generate a scaling factor and/or offset values for the characteristic such that the values may be converted into an engineering value by using the scaling factor and/or offset values so that the values for the component may be used to compare performance metrics between vehicles. For example, the accelerator pedal position values may range from 0 when not pushed at all to 240 when pushed completely to the floor. The value of 120 would mean little to someone comparing performance metrics, so a scaling factor may be applied to convert the 240 to 100%, such that the value of 120 would equate to 50%, which most people can understand more clearly. The scaling factor and offset values may be provided in association with the characteristic of the component of interest to the database creation subsystem 152.

The database creation subsystem 152 can generate a database for the vehicle 105 that may be stored in the data store 115. The database for the vehicle 105 can be specific to that vehicle, so other vehicles may each have their own database. Each database can be used to generate performance metrics for comparison between vehicles, which may then be used by designers to improve the design of other vehicles or vehicle 105. The database creation subsystem 152 generates a database that includes, for example, an entry for each characteristic of the components of interest. Each entry may include the component name, the message identifier associated with the characteristic, the byte numbers associated with the characteristic, and the scaling factor associated with the characteristic.

The data store 115 may store the databases created for each vehicle 105. Data store 115 may be any suitable storage device or computing device with storage. In some embodiments, data store 115 is accessible via a network or cloud based system as described with respect to FIG. 7.

Figure 2:
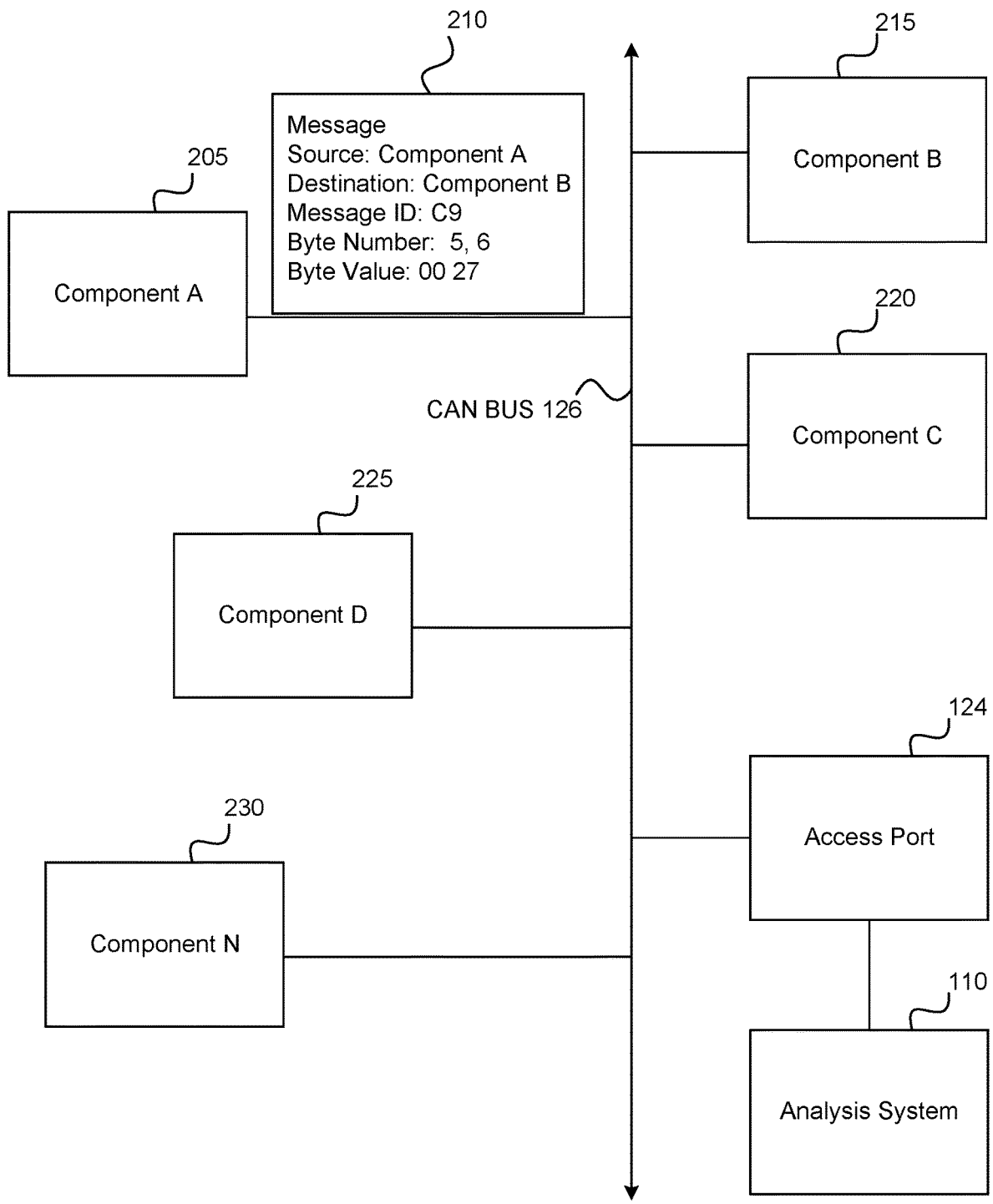
FIG. 2 illustrates an exemplary CAN bus and message, according to some embodiments.

FIG. 2 illustrates an exemplary CAN bus 126. The CAN bus 126 serves as the network over which messages are sent between components of the vehicle 105. In this example, CAN bus 126 includes component A 205, component B 215, component C 220, component D 225, component N 230, and access port 124. There may be as many components as needed in the vehicle 105 included on CAN bus 126 as indicated by component N 230. In addition, in some embodiments, CAN bus 126 may also be coupled with another CAN bus that may include other components. In some embodiments, some or all of the multiple CAN buses may be coupled to access port 124. The analysis system 110 may be coupled to the access port 124 for retrieving or scanning the messages on CAN bus 126. For simplicity, a single message 210 is shown on CAN bus 126. Message 210 includes several fields that indicate the source, destination, message identifier (ID), byte number, and byte value. In this example, the message ID is C9 and the byte numbers are 5 and 6. Access port 124 has access to all messages 210 sent across CAN bus 126, so while component B may receive the message 210, access port 124 and therefore analysis system 110 also receive message 210.

FIG. 3 illustrates an example display 300 output of CAN bus messages. Included in highlighted row 310 is the information from message 210. Each row shows that the messages have a count, the time the last message related to the message ID was received, a description of the message, the message ID, the length of the body of the message, the data byte values for the message, and the network on which the messages are communicated. As shown in highlighted row 310, the message 210 included the message ID C9 and the value 00 27 for bytes 5 and 6. Using row 310 as an example, the number of messages with the message ID C9 that have travelled on the CAN bus 126 since last reset is 24050. The body of the message contains eight bytes as indicated by the length field. The information for the component of interest is generally a two-byte value. Accordingly, the message body is reviewed for changing signals or values in the same two-byte section by the ML/ID/Rules subsystem 144. The changing values are within bytes 5 and 6, which is how the byte number is identified. The value of the byte number indicates the value of the characteristic of the component of interest (e.g., the accelerator pedal position). The remaining entries provide information for other components and message IDs sent across CAN bus 126.

In previous systems, without having the analysis system 110, a senior engineer may have to determine which of the message ID and byte numbers were related to a specific characteristic of a component by watching the values change on a display similar to display 300. To determine on a byte-by-byte basis which values may be changing in relation to certain activities within the vehicle 105, it may take an engineer weeks to decode all the messages and correlate them to characteristics of components within the vehicle.

Figure 4A:
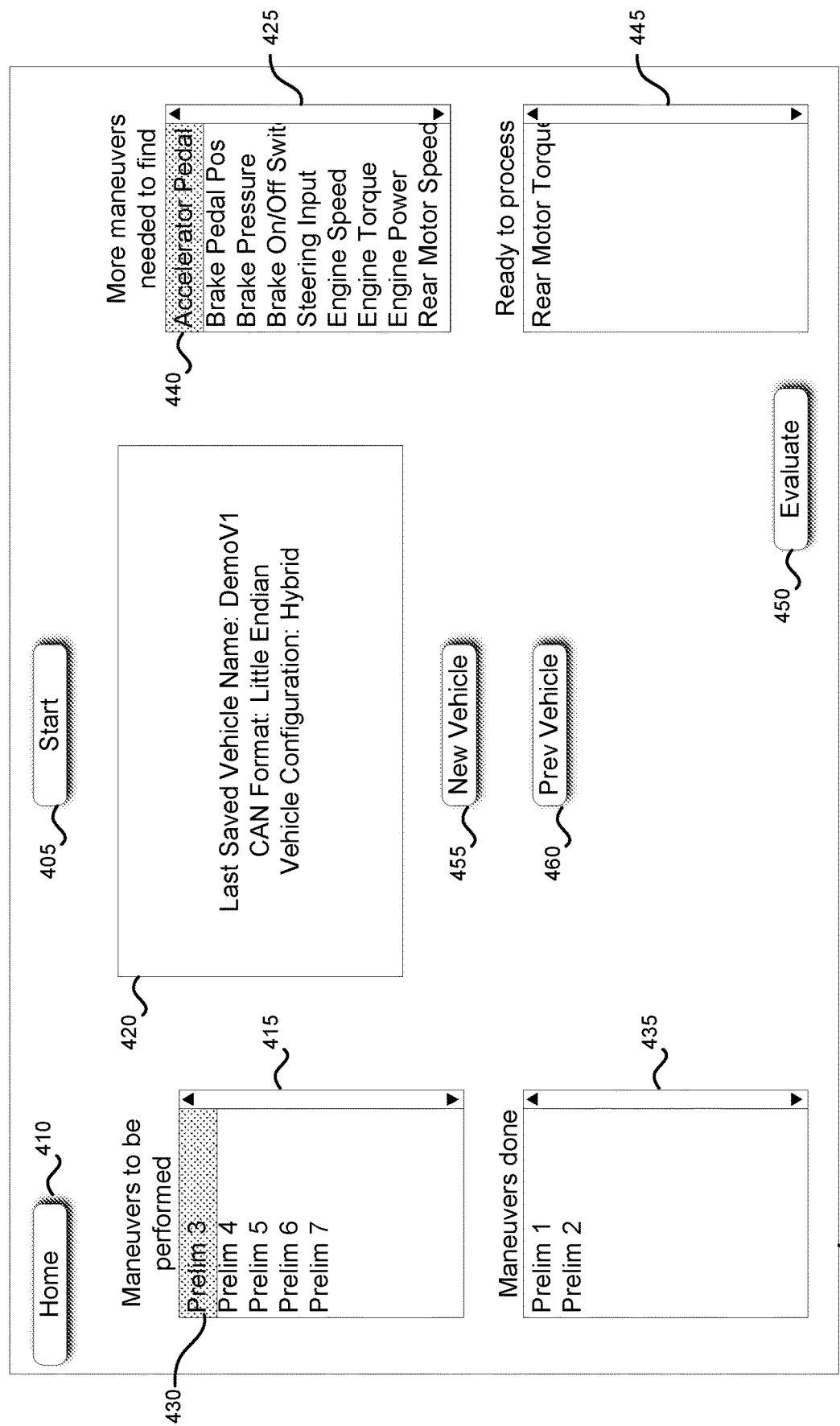
FIGS. 4A-4D illustrate example graphical user interfaces, according to some embodiments.

FIG. 4A illustrates an example graphical user interface (GUI) 400. The GUI 400 may be displayed on display 145 by user interface subsystem 150 as described with respect to FIG. 1. The analysis system 110 may be coupled to the access port 124 of the vehicle 105. The connection of the vehicle 105 to analysis system 110 may trigger the user interface subsystem 150 to show a GUI, such as GUI 400 on display 145. The GUI 400 may include a home button 410 for returning to a main menu, a list of maneuvers to be performed in listing 415, a listing of maneuvers that are completed in list 435, a display of currently configured information in instruction window 420, a list characteristics of components that are not yet decoded in list 425, a list of characteristics of components that are ready to process for final decoding in list 445, a button to begin a test phase with start button 405, a new vehicle button 455 for selecting a different vehicle to test, a previous vehicle button 460 for selecting a previous vehicle configuration, and an evaluate button 450 for processing any characteristics of components in the list 445.

A user may choose to start a new vehicle test configuration by selecting new vehicle button 455. In such an example, the user may have to select characteristics of the vehicle configuration for testing. For example, the vehicle may be an electric vehicle, a hybrid vehicle, or an internal combustion engine only vehicle. Each type of vehicle may have different characteristics of components. For example, the battery in an electric vehicle is different from the vehicle in an internal combustion engine vehicle. The testing for each type of vehicle may be different, and the characteristics of components of interest may be different. Accordingly, the type of vehicle may be one characteristic configured prior to testing a new vehicle. In some embodiments, selection of the previous vehicle button 460 may allow the user to select a previously configured vehicle for testing. In instruction window 420, the vehicle name, CAN format, and vehicle type are listed. In the example shown, there are a list of maneuvers to be performed in list 415, which a user or technician may highlight one of and select for performing the maneuver. Prelim 3 430 is highlighted for selection to perform. In some embodiments, the list of characteristics of components of interest in list 425 is also a selectable list. Selection of one, such as accelerator pedal position 440 as selected is highlighted. The list 430 may be updated with different testing maneuvers based on the selection in list 425. The maneuvers listed in list 415 based on the selection in list 425 may need to be performed to identify, for example, the message identifier and byte numbers associated with accelerator pedal position 440. In some embodiments, only some maneuvers in list 415 need be performed to isolate the message ID and byte numbers associated with the characteristic of interest highlighted in list 415.

Figure 4B:
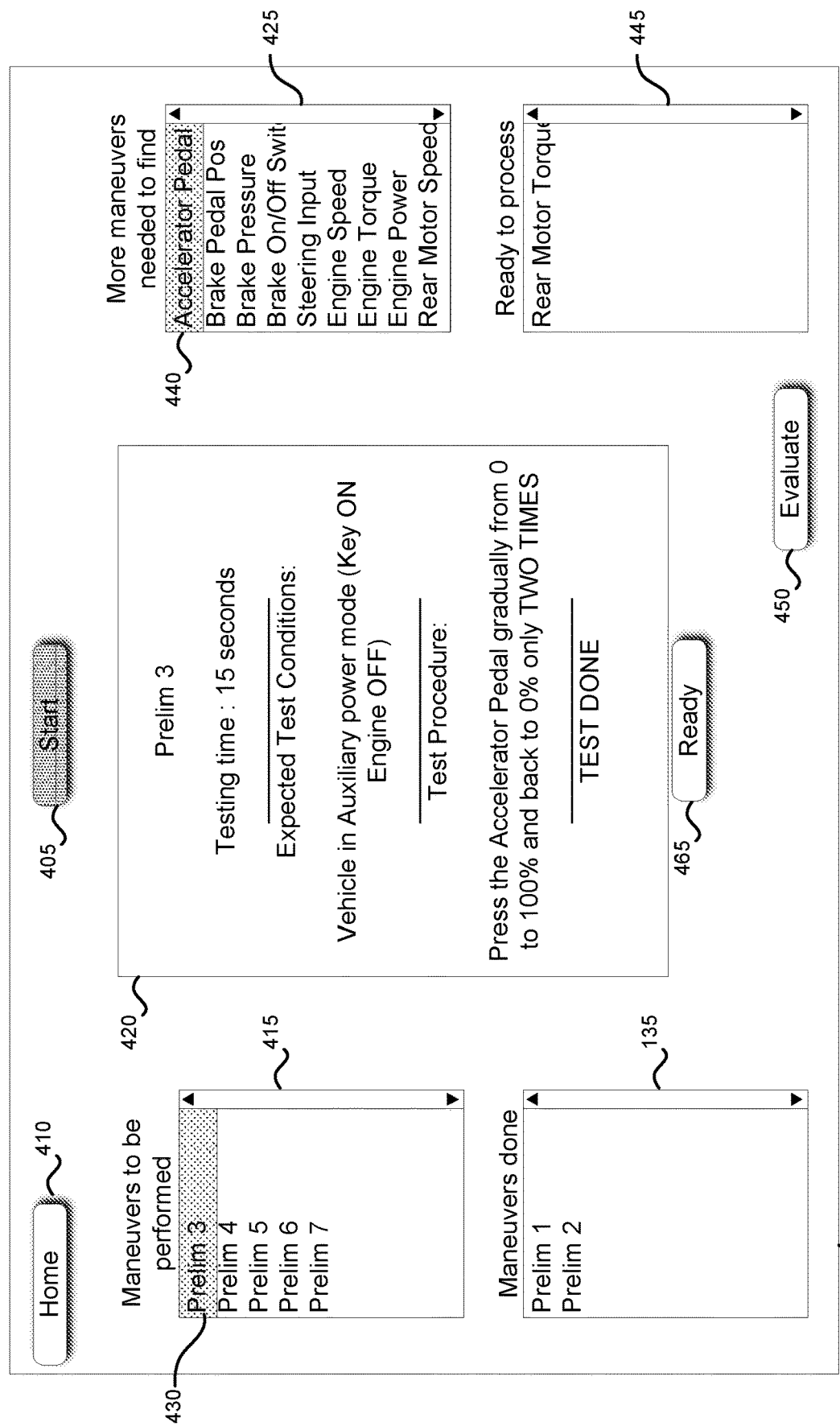

FIG. 4B illustrates the example GUI 400 after the technician pressed the start button 405 as described in FIG. 4A. The vehicle DemoV1, which is a hybrid, is the configuration selected and saved for use for the test. Some maneuvers including prelim 1 and 2 had previously been performed for this vehicle, and the characteristic of rear motor torque is ready for evaluation. The start button 405 for initiating the Prelim 3 430 maneuver was selected, which causes the GUI 400 to modify the instruction window 420 to display the test maneuver prelim 3 430 that the technician is to perform. In the example shown, the amount of time the technician should take to perform the test is 15 seconds. This indicates how long analysis system 110 will capture messages from CAN bus 126 after the ready button 465 is selected indicating that the technician is beginning the test. The test conditions that the technician should ensure are in place include that the vehicle 105 is in auxiliary power mode, meaning that the engine is off, but the key is in the auxiliary power position. Once the conditions are set, the technician should click the ready button 465 and perform the test procedure. In the example shown, the test procedure is for the technician to push the accelerator pedal gradually to the floor and back completely two times. The test maneuvers in list 415 are designed to isolate the characteristic of the component of interest selected in list 425. In this case, the accelerator pedal position 440 is the characteristic of interest, and having the engine off and no other interfering activity other than pressing and releasing the accelerator pedal helps to minimize the number of messages sent over CAN bus 126 during the testing.

Figure 4C:
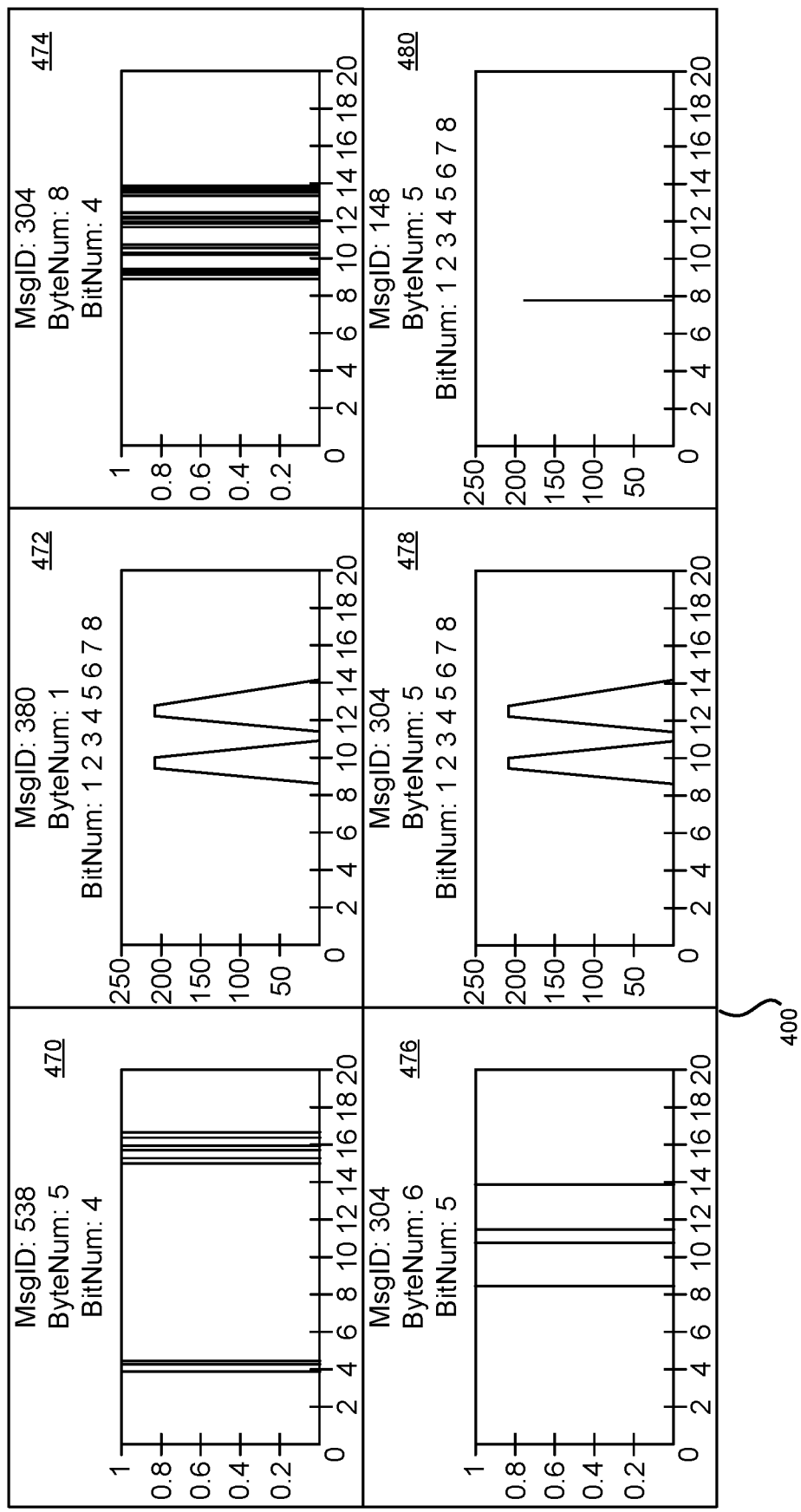

FIG. 4C illustrates the example GUI 400 showing graphs 470, 472, 474, 476, 478, and 480 of an initial set of example signals indicated by the testing maneuvers for accelerator pedal position 440. The user may have performed the needed maneuvers listed in list 415 for analyzing the accelerator pedal position 440 until the accelerator pedal position 440 moved to list 445 as ready to be evaluated. The user may then select the accelerator pedal position 440 in list 445 and select evaluate button 450 to generate GUI 400 as shown in FIG. 4C.

Selection of evaluate button 450 invokes the ML/ID/Rules subsystem 144 to analyze the signals of the messages. The graphs 470, 472, 474, 476, 478, and 480 may be some examples of graphs of signals captured during the testing performed by the technician during the time frames indicated by the testing maneuver instructions once the user selected the ready button 465. Each of graphs 470, 472, 474, 476, 478, and 480 represent a potential signal that may be associated with the characteristic of the component of interest. Each graph 470, 472, 474, 476, 478, and 48 indicates a potential message identifier and at least one potential byte number that the characteristic of the component of interest may be associated with. The graphing subsystem 146 may use the information from ML/ID/Rules subsystem 144 to generate the graphs and provide them to user interface subsystem 150 for display by display 145. For example, graph 470 indicates the signal from the message IDs 538 for byte number 5 is shown. The graphs each have an x-axis value of time. The y-axis values may be the values of the indicated characteristic based on the message ID, byte number, and bit numbers over the testing maneuver time period. For example, this may be the test performed of prelim 3 430 to determine the accelerator pedal position 440. The signals in graphs 470, 472, 474, 476, 478, and 480 may all be potential signals for the accelerator pedal position.

Figure 4D:
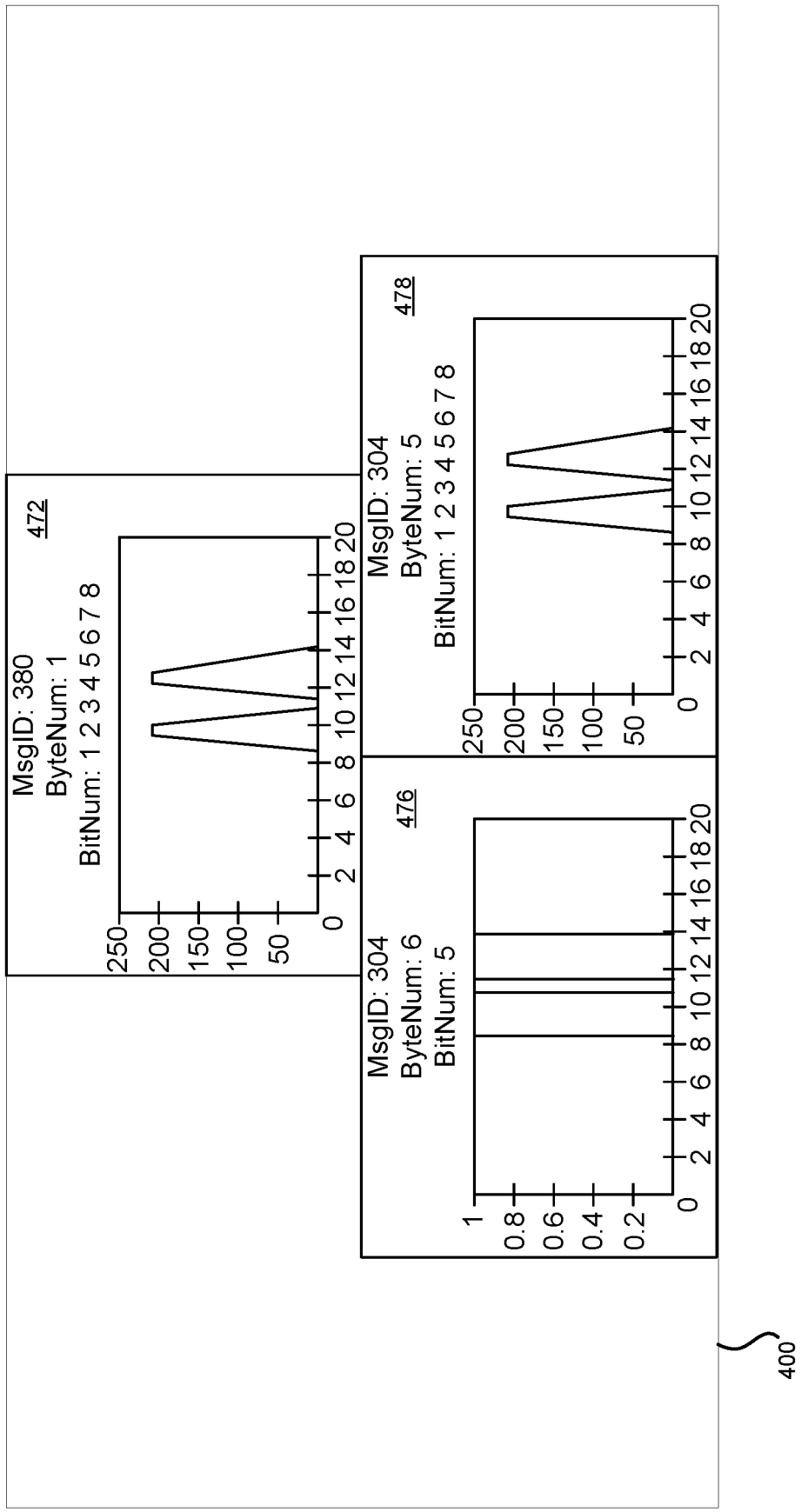

FIG. 4D illustrates the example GUI 400 showing graphs 472, 476, and 478 left after the decoding system executed the machine learning algorithm to narrow down the potential signals. In some embodiments, additional testing maneuvers for the vehicle for the characteristic or other characteristics listed in list 425 may be cross referenced to further narrow the graphs to those depicted in FIG. 4D. In some embodiments, the engineer may select one of the graphs, for example graph 472, to set the accelerator pedal position information to indicate that message ID 380 and byte number 1 correspond to the accelerator pedal position. This information may be stored in data store 115. For example, a database storing the vehicle 105 information may be generated that indicates that, for the particular vehicle 105, which may be associated with a manufacturer, make, model, year, type (e.g., hybrid, electric vehicle, and so forth), that may be used for any other vehicle with the same specifications because, for example, all 2019 Ford F-150 hybrid trucks likely use the same memory structure and messaging structure, so all vehicles of that year, make, model, and type may use the same message ID and byte number for the accelerator pedal position. Further, a scaling factor may be generated and stored in the database with the accelerator pedal position information. For this example, the highest entry for the accelerator pedal position is 200, which means little because a technician has no idea what the upper limit of the values may be if he receives a value of 50. The scaling factor may, for example, correlated the 200 value to 100%, such that a value of 50 may indicate 25%, which any technician or engineer may be able to understand and compare with other vehicles.

In some embodiments, the engineer or user may view the graphs on a live basis such that the graph is generated and updated in real-time as the testing maneuver is performed. The engineer or user may view the graph being generated on the analysis system 110 or remotely on a computer connected via a network. In some embodiments, the graph generation may be replayed at a later time. The ability to watch the graph generate during the testing maneuver may help the user or engineer identify whether there is a lag time, for example, between the testing maneuver activities and the messages over the CAN bus, which may help the engineer or user identify which signal is associated with the characteristic of the component of interest.

Figure 5:
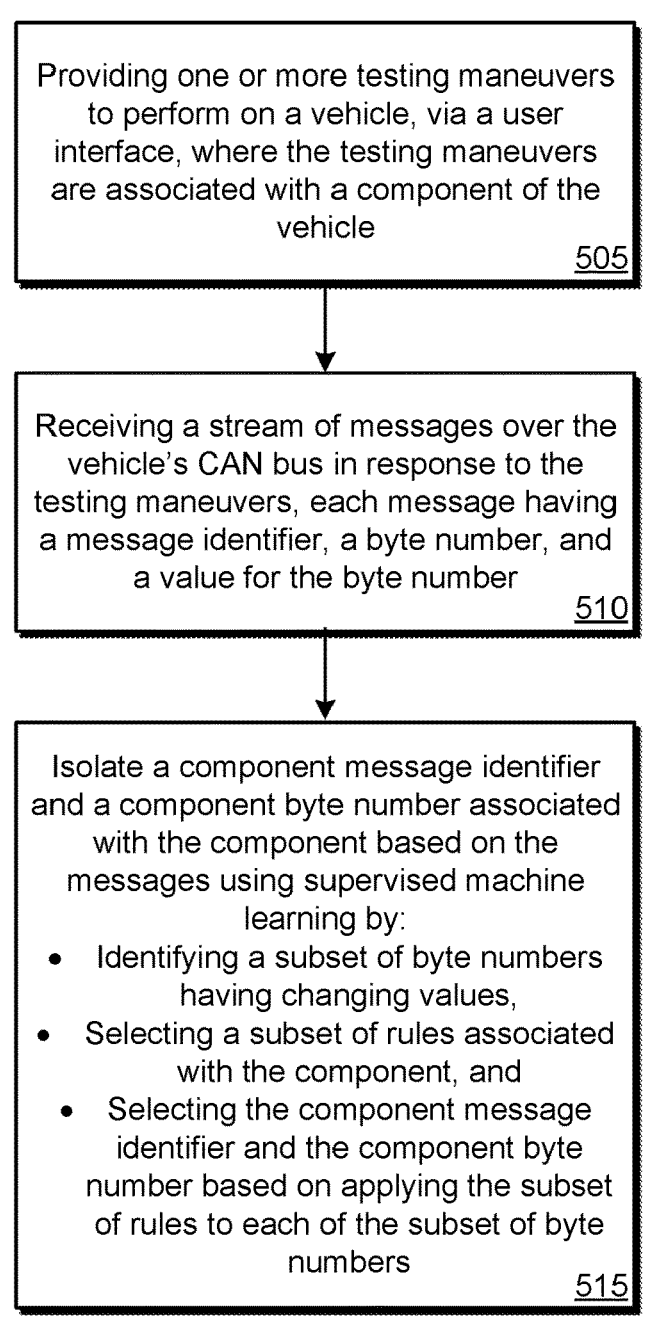
FIG. 5 illustrates a method for decoding CAN messages, according to some embodiments.

FIG. 5 illustrates an example method 500 for decoding CAN messages. Method 500 may be performed by, for example, analysis system 110. Method 500 may include more or fewer steps, and the steps of method 500 may be performed in the order listed or in another order. Additionally, steps of method 500 may be performed in parallel in some instances. Method 500 may begin at step 505 with the analysis system 110 providing one or more testing maneuvers to perform on a vehicle, via a user interface, where the testing maneuvers are associated with a component of the vehicle. For example, the GUI 400 as depicted in FIGS. 4A and 4B may be used to provide maneuvers to be performed. Using the example depicted in FIG. 4B, the prelim 3 430 maneuver is provided to identify the accelerator pedal position 440 characteristic. Step 505 may be performed more specifically by user interface subsystem 150 as depicted with respect to FIG. 1.

At step 510, the analysis system 110 may receive a stream of messages over the vehicle's CAN bus in response to the testing maneuvers, each message having a message identifier, a byte number, and a value for the byte number. For example, message 210 as depicted with respect to FIG. 2 may be an example of a message generated in response to a testing maneuver that is captured by analysis system 110 during the testing maneuver performance. As discussed with respect to GUI 400 of FIG. 4B, the testing time of, for example, 15 seconds may be the time that the analysis system 110 collects messages from CAN bus 126 after the technician selects the ready button 465. In some embodiments a buffer time may be added to the testing time to account for any delay between the technician clicking the ready button 465 and performing the testing maneuver. For example, the captured messages may be during the time period from when the technician selects the ready button 465 for 25 seconds, for example, to give a 10 second buffer. In some embodiments, the buffer may be longer or shorter than 10 seconds.

At step 515, the analysis system 110 may isolate a component message identifier and a component byte number associated with the component based on the messages using supervised machine learning. For example, the ML/ID/Rules subsystem 144 may use supervised machine learning to apply the machine learning rules to isolate the message identifier and byte numbers associated with the characteristic of the component of interest. The supervised machine learning algorithm may identify the subset of byte numbers having changing values. Stated differently, the supervised machine learning algorithm may identify the signals in the messages on the CAN bus that having changing values. The supervised machine learning algorithm may also select a subset of rules associated with the component. For example, when identifying the accelerator pedal position, the supervised machine learning algorithm may apply rules such as that the value may not be negative, the end value must equal the start value, and so forth. The supervised machine learning algorithm may also select (i.e., isolate) the component message identifier and the component byte number based on applying the subset of rules to each of the subsystem of byte numbers. For example, in determining the accelerator pedal position, the supervised machine learning algorithm may discard many signals that are inactive or that indicate activity before or after the testing phase indicating a checksum or counter value. The supervised machine learning algorithm may further discard signals that have values that do not comport with the applied rules. For example, signals with a negative value may be discarded. Additionally, signals that do not start and end with the same value may be discarded. Once complete, the supervised machine learning algorithm may have a result with one or a few signals that could potentially be the signal associated with the characteristic of the component of interest. In the example of graphs 470, 472, 474, 476, 478, and 480, the accelerator pedal position was narrowed down to initially six signals and then to three signals. The engineer may review the few graphs and identify which of the signals is the signal associated with the characteristic of the component of interest with relative ease as compared to identifying it by review of the changing byte numbers.

In some embodiments, the graphs of the signals, such as graph 470, 472, 474, 476, 478, and 480 may be generated and viewed in real-time as the test is being performed such that the engineer may watch, for example graph 472 generate over time as the engineer or user presses the accelerator pedal. As the user presses the accelerator pedal, the increases in the signal to the value of 200 correspond to the pressing of the accelerator pedal, which the user or engineer may see as the activity happens during the testing maneuver. Such viewing may make identification of the exact signal corresponding to the characteristic of the component of interest easier for the user or engineer.

Examples of Computing Environments for Implementing Certain Embodiments

Figure 6:
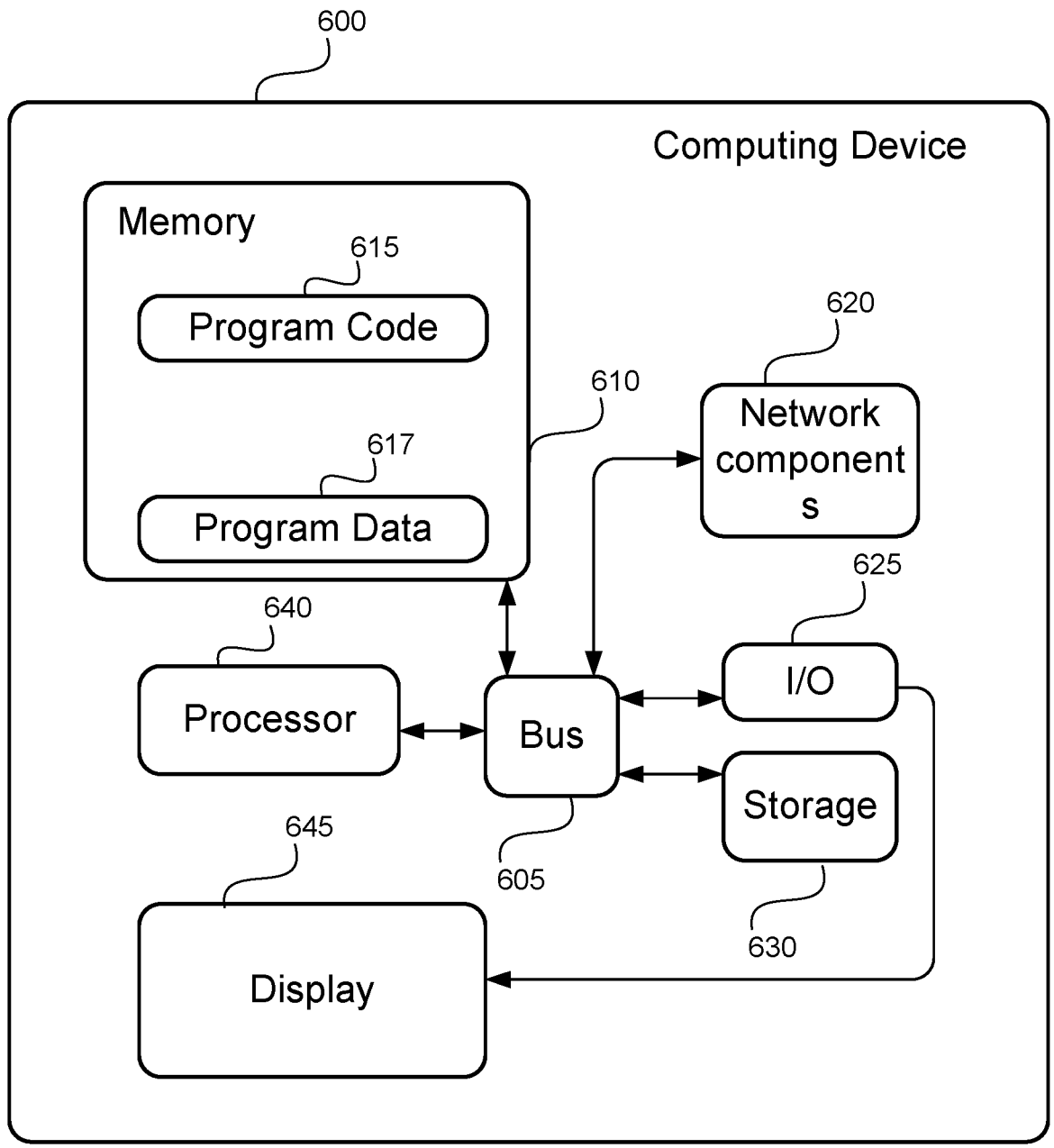
FIG. 6 illustrates a computer system, according to some embodiments.
Figure 7:
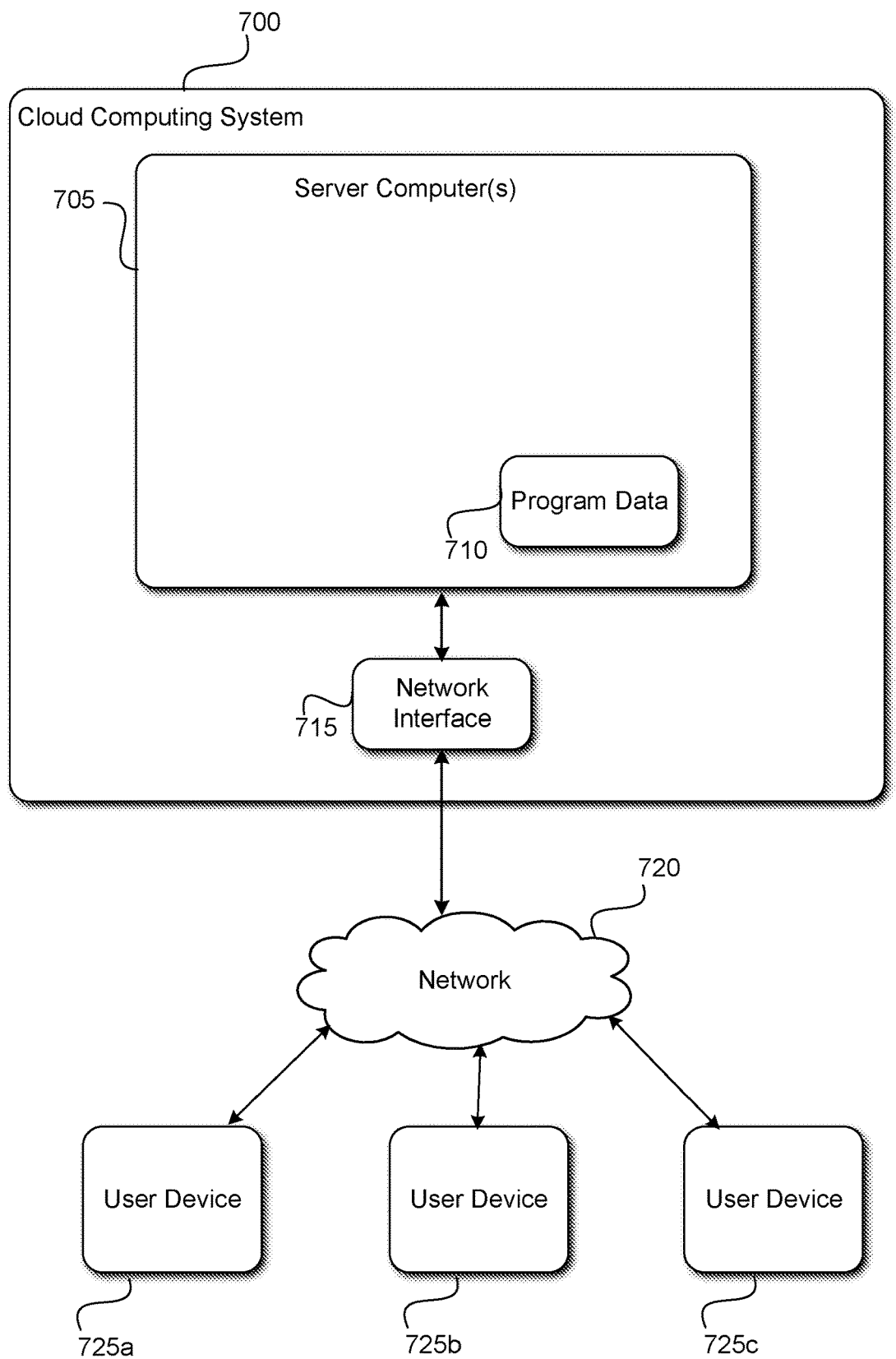
FIG. 7 illustrates a cloud computing system, according to some embodiments.

Any suitable computing system or group of computing systems can be used for performing the operations described herein. For example, FIG. 7 illustrates a cloud computing system 700 by which at least a portion of the functionality of analysis system 110 may be offered. FIG. 6 depicts an example of a computing device 600 that may be at least a portion of vehicle 105 and/or analysis system 110. The implementation of the computing device 600 could be used for one or more of the subsystems depicted in FIG. 1. In an embodiment, a single vehicle 105 or an analysis system 110 having devices similar to those depicted in FIG. 6 (e.g., a processor, a memory, etc.) combines the one or more operations and data stores depicted as separate subsystems in FIG. 1.

FIG. 6 illustrates a block diagram of an example of a computer system 600. Computer system 600 can be any of the described computers herein including, for example, analysis system 110 or a computer within vehicle 105. The computing device 600 can be or include, for example, an integrated computer, a laptop computer, desktop computer, tablet, server, or other electronic device.

The computing device 600 can include a processor 640 interfaced with other hardware via a bus 605. A memory 610, which can include any suitable tangible (and non-transitory) computer readable medium, such as RAM, ROM, EEPROM, or the like, can embody program components (e.g., program code 615) that configure operation of the computing device 600. Memory 610 can store the program code 615, program data 617, or both. In some examples, the computing device 600 can include input/output ("I/O") interface components 625 (e.g., for interfacing with a display 645, keyboard, mouse, and the like) and additional storage 630.

The computing device 600 executes program code 615 that configures the processor 640 to perform one or more of the operations described herein. Examples of the program code 615 include, in various embodiments, data intake subsystem 142, ML/ID/Rules subsystem 144, graphing subsystem 146, scaling subsystem 148, user interface subsystem 150, database creation subsystem 152, or any other suitable systems or subsystems that perform one or more operations described herein (e.g., one or more development systems for configuring an interactive user interface). The program code 615 may be resident in the memory 610 or any suitable computer-readable medium and may be executed by the processor 640 or any other suitable processor.

The computing device 600 may generate or receive program data 617 by virtue of executing the program code 615. For example, the vehicle databases, signal data, and CAN bus messages, are all examples of program data 617 that may be used by the computing device 600 during execution of the program code 615.

The computing device 600 can include network components 620. Network components 620 can represent one or more of any components that facilitate a network connection. In some examples, the network components 620 can facilitate a wireless connection and include wireless interfaces such as IEEE 802.11, Bluetooth, or radio interfaces for accessing cellular telephone networks (e.g., a transceiver/antenna for accessing CDMA, GSM, UMTS, or other mobile communications network). In other examples, the network components 620 can be wired and can include interfaces such as Ethernet, USB, or IEEE 1394.

Although FIG. 6 depicts a single computing device 600 with a single processor 640, the system can include any number of computing devices 600 and any number of processors 640. For example, multiple computing devices 600 or multiple processors 640 can be distributed over a wired or wireless network (e.g., a Wide Area Network, Local Area Network, or the Internet). The multiple computing devices 600 or multiple processors 640 can perform any of the steps of the present disclosure individually or in coordination with one another.

In some embodiments, the functionality provided by the decoding system 100 may be offered as cloud services by a cloud service provider. For example, FIG. 7 depicts an example of a cloud computing system 700 offering an analysis service that can be used by a number of user subscribers using user devices 725a, 725b, and 725c across a data network 720. User devices 725a, 725b, and 725c could be examples of a vehicle 105 or analysis system 110 as described above. In the example, the intelligence service may be offered under a Software as a Service (SaaS) model. One or more users may subscribe to the analysis service, and the cloud computing system performs the processing to provide the analysis service to subscribers. The cloud computing system may include one or more remote server computers 705.

The remote server computers 705 include any suitable non-transitory computer-readable medium for storing program code and program data 710, or both, which is used by the cloud computing system 700 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript. In various examples, the server computers 705 can include volatile memory, non-volatile memory, or a combination thereof.

One or more of the servers 705 execute the program code 710 that configures one or more processors of the server computers 705 to perform one or more of the operations that provide analysis services, including the ability to execute the ML/ID/Rules subsystem 144 remotely and provide the information back to analysis system 110, and so forth, to perform analysis services. As depicted in the embodiment in FIG. 7, the one or more servers 705 provide the services to perform analysis services. Any other suitable systems or subsystems that perform one or more operations described herein (e.g., one or more development systems for configuring an interactive user interface) can also be implemented by the cloud computing system 700.

In certain embodiments, the cloud computing system 700 may implement the services by executing program code and/or using program data 710, which may be resident in a memory device of the server computers 705 or any suitable computer-readable medium and may be executed by the processors of the server computers 705 or any other suitable processor.

In some embodiments, the program data 710 includes one or more datasets and models described herein. Examples of these datasets include dealership data, classification data, etc. In some embodiments, one or more of data sets, models, and functions are stored in the same memory device. In additional or alternative embodiments, one or more of the programs, data sets, models, and functions described herein are stored in different memory devices accessible via the data network 715.

The cloud computing system 700 also includes a network interface device 715 that enable communications to and from cloud computing system 700. In certain embodiments, the network interface device 715 includes any device or group of devices suitable for establishing a wired or wireless data connection to the data networks 720. Non-limiting examples of the network interface device 715 include an Ethernet network adapter, a modem, and/or the like. The servers 705 are able to communicate with the user devices 725a, 725b, and 725c via the data network 720 using the network interface device 715.

General Considerations

While the present subject matter has been described in detail with respect to specific aspects thereof, it will be appreciated that those skilled in the art, upon attaining an understanding of the foregoing, may readily produce alterations to, variations of, and equivalents to such aspects. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Aspects of the methods disclosed herein may be performed in the operation of such computing devices. The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device. The order of the blocks presented in the examples above can be varied—for example, blocks can be re-ordered, combined, and/or broken into sub-blocks. Certain blocks or processes can be performed in parallel.

What is claimed is:

1. A method for decoding messages on a vehicle controller area network (CAN) bus, the method comprising:
providing, by a computer system, one or more testing maneuvers to perform on a vehicle, wherein the testing maneuvers are provided to a technician via a graphical user interface, and wherein the one or more testing maneuvers are associated with a component of the vehicle;
receiving, by the computer system, a stream of messages over a CAN bus of the vehicle in response to the technician performing the one or more testing maneuvers, each message comprising a message identifier, a byte number, and a value for the byte number, wherein the byte number represents a location of data within the message;
isolate a component message identifier and a component byte number associated with the component based on the messages in the stream of messages, wherein isolating the component message identifier and the component byte number comprises using a supervised machine learning algorithm to:
identify a subset of byte numbers within the stream of messages having changing values;
select a subset of rules from a plurality of rules associated with the component; and
select the component message identifier and the component byte number based on applying the subset of rules to each byte number of the subset of byte numbers.

2. The method of claim 1, wherein the one or more testing maneuvers are based on a type of the vehicle.

3. The method of claim 1, further comprising:
providing, by the computer system, one or more second testing maneuvers to perform on the vehicle; and
receiving, by the computer system a second stream of messages over the CAN bus of the vehicle in response to the technician performing the one or more second testing maneuvers, wherein isolating the component is further based on the messages in the second stream of messages.

4. The method of claim 1, further comprising:
generating, by the computer system, a graph representing the values of the component byte number over a time period in which the technician performed the one or more testing maneuvers; and
providing the graph via the graphical user interface.

5. The method of claim 4, wherein the graph is updated on a live basis for a user to observe during the time period.

6. The method of claim 4, wherein isolating the component message identifier and the component byte number associated with the component comprises isolating a potential message identifier and potential byte number that are potentially associated with the component, the method further comprising:
generating, by the computer system, a second graph representing the values of the potential byte number over the time period; and
providing the second graph via the graphical user interface.

7. The method of claim 6, further comprising:
receiving, by the computer system via the graphical user interface, a selection of the graph, the selecting indicating the component byte number as the correct component byte number associated with the component; and
saving, by the computer system, the component message identifier and the component byte number as associated with the component.

8. The method of claim 1, further comprising:
generating, by the computer system, a performance metric database for the vehicle; and
storing, by the computer system in the performance metric database, the component message identifier, the component byte number, and an association between the component, the component message identifier, and the component byte number.

9. The method of claim 8, further comprising:
generating a scaling factor and offset values to apply to values of the component byte number; and
storing, by the computer system in the performance metric database, the scaling factor, the offset values, and an association between the scaling factor, the offset values, and the component.

10. A system, comprising:
one or more processors; and
a memory having stored thereon instructions that, upon execution by the one or more processors, cause the one or more processors to:
provide one or more testing maneuvers to perform on a vehicle via a graphical user interface, wherein the one or more testing maneuvers are associated with a component of the vehicle;
receive a stream of messages from a controller area network (CAN) bus of the vehicle in response to a technician performing the one or more testing maneuvers, each message comprising a message identifier, a byte number, and a value for the byte number, wherein the byte number represents a location of data within the message;
isolate a component message identifier and a component byte number associated with the component based on the messages in the stream of messages, wherein isolating the component message identifier and the component byte number comprises using a supervised machine learning algorithm to:
identify a subset of byte numbers within the stream of messages having changing values;
select a subset of rules from a plurality of rules associated with the component; and
select the component message identifier and the component byte number based on applying the subset of rules to each byte number of the subset of byte numbers.

11. The system of claim 10, wherein the one or more testing maneuvers are based on a type of the vehicle.

12. The system of claim 10, wherein the instructions comprise further instructions that, upon execution by the one or more processors, cause the one or more processors to:
provide one or more second testing maneuvers to perform on the vehicle via the graphical user interface; and
receive a second stream of messages from the CAN bus of the vehicle in response to the technician performing the one or more second testing maneuvers, wherein isolating the component is further based on the messages in the second stream of messages.

13. The system of claim 10, wherein the instructions comprise further instructions that, upon execution by the one or more processors, cause the one or more processors to:

generate a graph representing the values of the component byte number over a time period in which the technician performed the one or more testing maneuvers; and provide the graph via the graphical user interface.

14. The system of claim 13, wherein the graph is updated on a live basis for a user to observe during the time period.

15. The system of claim 13, wherein the instructions for isolating the component message identifier and the component byte number associated with the component comprises further instructions that, upon execution by the one or more processors, cause the one or more processors to:

isolate a potential message identifier and potential byte number that are potentially associated with the component;

generate a second graph representing the values of the potential byte number over the time period; and provide the second graph via the graphical user interface.

16. The system of claim 15, wherein the instructions comprise further instructions that, upon execution by the one or more processors, cause the one or more processors to:

receive, via the graphical user interface, a selection of the graph, the selecting indicating the component byte number as the correct component byte number associated with the component; and save the component message identifier and the component byte number as associated with the component.

17. The system of claim 10, wherein the instructions comprise further instructions that, upon execution by the one or more processors, cause the one or more processors to:

generate a performance metric database for the vehicle; and store, in the performance metric database, the component message identifier, the component byte number, and an association between the component, the component message identifier, and the component byte number.

18. The system of claim 17, wherein the instructions comprise further instructions that, upon execution by the one or more processors, cause the one or more processors to:

generate a scaling factor and offset values to apply to values of the component byte number; and store, in the performance metric database, the scaling factor, the offset values, and an association between the scaling factor, the offset values, and the component.

19. A computer-readable media device having stored thereon instructions that, upon execution by one or more processors, cause the one or more processors to:

provide one or more testing maneuvers to perform on a vehicle via a graphical user interface, wherein the one or more testing maneuvers are associated with a component of the vehicle;

receive a stream of messages from a controller area network (CAN) bus of the vehicle in response to a technician performing the one or more testing maneuvers, each message comprising a message identifier, a byte number, and a value for the byte number, wherein the byte number represents a location of data within the message;

isolate a component message identifier and a component byte number associated with the component based on the messages in the stream of messages, wherein isolating the component message identifier and the component byte number comprises using a supervised machine learning algorithm to:

identify a subset of byte numbers within the stream of messages having changing values;

select a subset of rules from a plurality of rules associated with the component; and select the component message identifier and the component byte number based on applying the subset of rules to each byte number of the subset of byte numbers.

20. The computer-readable media device of claim 19, wherein the one or more testing maneuvers are based on a type of the vehicle.

* * * * *